(12) United States Patent
González

(10) Patent No.: US 6,877,694 B2
(45) Date of Patent: Apr. 12, 2005

(54) AIRCRAFT SECURITY SYSTEM

(76) Inventor: Manuel Ardura González, Alta 22-Chalet Ciudad de Santo Domingo, 28120 Algete (Madrid) (ES)

( * ) Notice: Subject to any disclaimer, the term of this patent is extended or adjusted under 35 U.S.C. 154(b) by 0 days.

(21) Appl. No.: 10/809,037

(22) Filed: Mar. 25, 2004

(65) Prior Publication Data

US 2005/0056727 A1 Mar. 17, 2005

Related U.S. Application Data

(63) Continuation of application No. PCT/ES02/00449, filed on Sep. 25, 2002.

(30) Foreign Application Priority Data

Sep. 25, 2001 (ES) .......................................... 200102150

(51) Int. Cl.$^7$ .............................................. B64D 11/00
(52) U.S. Cl. ............................... 244/118.5; 244/117 R; 244/121
(58) Field of Search ......................... 244/117 R, 118.5, 244/118.6, 119, 121

(56) References Cited

U.S. PATENT DOCUMENTS

| | | | | |
|---|---|---|---|---|
| 6,783,098 | B1 * | 8/2004 | Chavez .................... | 244/118.5 |
| 2003/0058112 | A1 * | 3/2003 | Gleine ..................... | 340/573.1 |
| 2003/0062448 | A1 * | 4/2003 | Takeshima ............... | 244/118.5 |
| 2003/0066929 | A1 * | 4/2003 | Valencia et al. ......... | 244/118.5 |
| 2003/0117286 | A1 * | 6/2003 | Lay ........................... | 340/574 |
| 2004/0094667 | A1 * | 5/2004 | D'Alvin .................. | 244/118.5 |

* cited by examiner

*Primary Examiner*—J. Woodrow Eldred
(74) *Attorney, Agent, or Firm*—Klauber & Jackson

(57) ABSTRACT

It guarantees the immediate disablement of any violent action bringing the perpetrators under control without any possibility of escape, attack or aggression. It includes an image transmission system with night-time and daytime vision in an angle of 360°, wide angle and zoom, the image being transmitted continuously to the cockpit (2) and to a security cabin (4), as well as providing images for ground. The cabins (2, 4) are sterile, with hermetic sealing, furthermore having an independent communication system between them and an independent aeration and ventilation system. Selective switched triggers for paralysing gas are provided in both cabins (2, 4) with independent action by the captain of the aircraft in order to inundate the passenger cabin with complete paralysis of everyone therein.

17 Claims, 3 Drawing Sheets

AIRCRAFT SECURITY SYSTEM

RELATED APPLICATIONS

The present application is a Continuation of co-pending PCT Application No. PCT/ES02/00449, filed Sep. 25, 2002, which in turn, claims priority from Spanish Application Serial No. 200102150, filed Sep. 25, 2001. Applicants claim the benefits of 35 U.S.C. §120 as to the PCT application and priority under 35 U.S.C. §119 as to said Spanish application, and the entire disclosures of both applications are incorporated herein by reference in their entireties.

OBJECT OF THE INVENTION

As stated in the title of this descriptive specification, the present invention refers to an aircraft security system, which defines a system that is both preventive and one of response in the event of a hijacking in aircraft, including certain relevant and advantageous characteristics on account of its effectiveness, in relation to conventional security systems.

With the proposed security system, the immediate disablement of any violent action is guaranteed, with the perpetrators being brought under control without any possibility of escape, attack or aggression.

BACKGROUND OF THE INVENTION

Nowadays, security systems for aircraft do not guarantee the immediate disablement of the aggressors in any violent action, and conventional security equipment also include firearms with the imminent danger that this action entails. They do not guarantee the security of the passengers nor the intrinsic value of the aircraft.

Document BE-A-761488 describes a procedure for rendering inoffensive the passengers in an aircraft and a device for embodying said procedure. The procedure consist on hermetically isolating, at least the cockpit from the passengers cabin and providing expulsion means controlled by a member of the crew for expelling a product for immobilizing the passengers such as a soporific product.

Document DE-A-19732806 describes a surveillance for use in aircraft interiors, especially in passenger aeroplanes.

The aim of the invention is to increase the security on board aircraft, especially on board passenger aeroplanes in the event of unexpected incidents such as accidents or hijackings. To this end, the inventive surveillance device has image acquisition devices which are installed on board the aircraft, an on-board communications unit with inputs for the image acquisition devices and a memory unit for preferably compressed storage of the image data supplied by the image acquisition devices, a steady-state communications unit which exchanges data with the on-board communications unit, image data processing and image reproduction devices being connected to said steady-state communications unit, and transmitting and receiving devices for transmitting at least the image data from the on-board communications unit to the steady-state communications unit and control data from the steady-state to the on-board communications unit.

DESCRIPTION OF THE INVENTION

In general terms, the aircraft security system, which constitutes the object of the invention, includes a series of elements which together comprise an integral system of protection.

It includes preventive elements and other response systems in the event of emergency.

Included among the former are the image capturing means and image transmitting means via digital technology with components capable of providing daytime and night-time vision, in an angle of 360°, wide angle and zoom. The image is continuously transmitted to the reception panel in the cockpit and to the reception panel in at least one security cabin provided for the purpose in a position away from the cockpit, with continuous recording being made on the digital recording means of at least 14 images per second in data storage means, providing images for ground via data transmission means.

It is also planned to have approval of a sterile cabin, adapted for including hermetic sealing preventing the entry of gases in accordance with safety regulations for armour-plating against physical penetration.

Also provided are means of independent intercommunication between the at least one security cabin and the cockpit. The means of independent intercommunication between the at least one security cabin and the cockpit comprise at least one means selected from audio means video means and combinations thereof.

The aircraft also has first means of aeration and ventilation that are independent for the cockpit and independent second means of aeration and ventilation for the at least one security cabin. The first means of aeration and ventilation and the second means of aeration and ventilation can be shared by the cockpit and by the at least one security cabin.

As response systems in cases of emergency, the security system has a gas storage system in accordance with safety regulations for gaseous substances of determined physical and chemical characteristics. In particular, this regulation can be regulation RD 2216/1985, using nitrous oxide or similar.

There is also a means of expulsion as per the safety regulation for gaseous substances of the following physical and chemical characteristics:

| | |
|---|---|
| Sublimation temperature | −88° C. |
| Critical temperature | +36° C. |
| Triple point | −80° C. |
| Appearance and colour | Colourless |

The security system includes equipment for the security crew and flight personnel, pilot, co-pilot and radio operator comprising filtration masks for the gaseous compound used.

Selective switched triggers of paralysing gas are provided in the at least one security cabin and in the cockpit. The triggers are provided with means for being actuated by the captain of the aircraft independently. When the triggers are actuated, the passenger cabin becomes inundated with a complete paralysis of everyone therein.

With this arrangement, the emergency system possesses the following operational development:

By means of the preventive system in an inaccessible compartment, the security equipment is to be found divided into two separate areas. From the moment the doors are closed for take-off until landing, any movement by passengers is verified by means of the television control system, and any incident that takes place will be monitored and recorded continuously. In the event of an aggression in the space occupied by the passengers and by means of the internal communication existing between the at least one security cabin and the cockpit, the members of the security team will assess the incident and use the system of triggering the nitrous oxide compound or similar, inundating the passenger cabin, which, given the characteristics of the gas applied, will, within a maximum of twelve seconds, produce complete paralysis of everyone on board, except those whose are in the cockpit and in the at least one security cabin.

The crew will be warned by means of a light and acoustic signal so that they can prepare themselves for an emergency in accordance with the emergency manual.

Once the number of minutes established in the standards of action have passed, a member of the security team, protected by a mask designed for the specific gas being used, will intervene, bringing those responsible for the attack under control, at all times being directed and supported by the second member of the security team, who will under no circumstances abandon the control and recording posts, and who, together with the captain, will be able to again inundate any zone of conflict not under control in the event of any emergency.

The security system that is advocated guarantees the immediate disablement of any violent action, bringing the perpetrators under control without any possibility of fleeing, attack or aggression, given the immediacy of the action of the gas used, mentioned above, or similar gases, which must not be toxic, they must leave no side effects, they must be approved by the health authorities and be non-flammable. The only effect produced on the passengers with the application of the nitrogen compound (nitrogen hemioxide, for example) is a tranquillising effect with a cessation of activity.

In no case will the security team use firearms and they will at all times act in accordance with their training in order to bring suspects under control, and in order to guarantee their action they will use darts containing paralysing substances used in veterinary work.

Once the suspects have been brought under control, the system activates the evacuation of the gas inundating the passenger cabin and reactivates the entrance of oxygen enriched air in order to revive all the passengers.

The safety and intervention teams will again return to their posts for a possible second manoeuvre.

At the moment in which the emergency system is activated, whatever images are being produced will be sent under emergency code for monitoring from ground by data transmission means, since the aircraft will be under a possible hijacking code.

The security system considers the emission of chemical components which cannot be filtered by conventional masks, where the real base of the system can comprise nitrogen hemioxide.

In order to facilitate an understanding of the characteristics of the invention and forming an integral part of this descriptive specification, attached are some sheets of drawings in which, by way of illustration only and not to be regarded as restrictive, the following have been represented:

DESCRIPTION OF A PREFERRED EMBODIMENT

Figure 1:
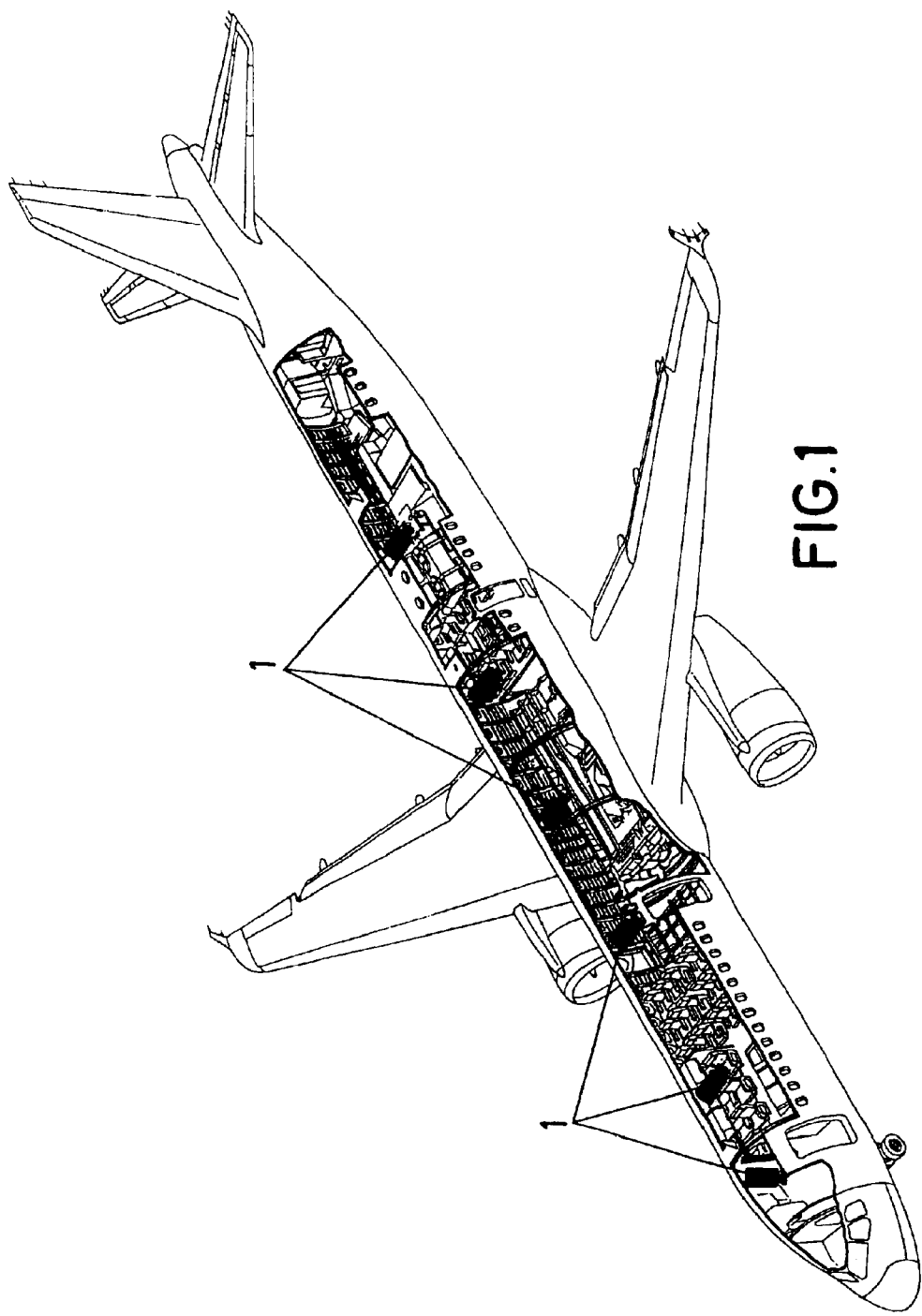
FIG. 1 is a schematic perspective view of an aircraft having control domes at strategic points endowed with night-time and daytime vision cameras, operating continuously.

Described below is an embodiment of the invention with reference to the numbering adopted in the figures. The number of control domes (1) included in the aircraft security system depends on the length of the cabin and on the passenger capacity. The aircraft shown in FIG. 1 has six control domes (1) installed. The control domes (1) are fitted with the necessary technology for guaranteeing perfect vision in any part of the aircraft, and there are also strategic cameras guaranteeing continual vision at all times.

Figure 2:
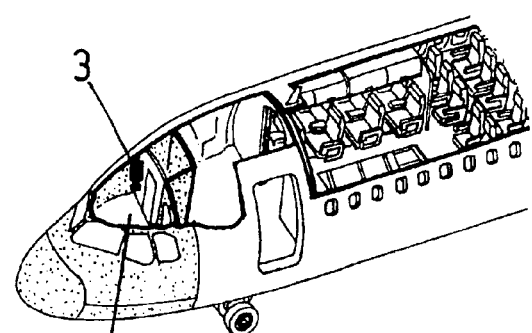
FIG. 2 is a partial view of an aircraft showing the cockpit, protected by a permanent camera.

FIG. 2 shows the cockpit zone (2) protected by the permanent camera (3) and provided with isolation elements for gases already mentioned, including direct and protected access to the physiological services area.

Figure 3:
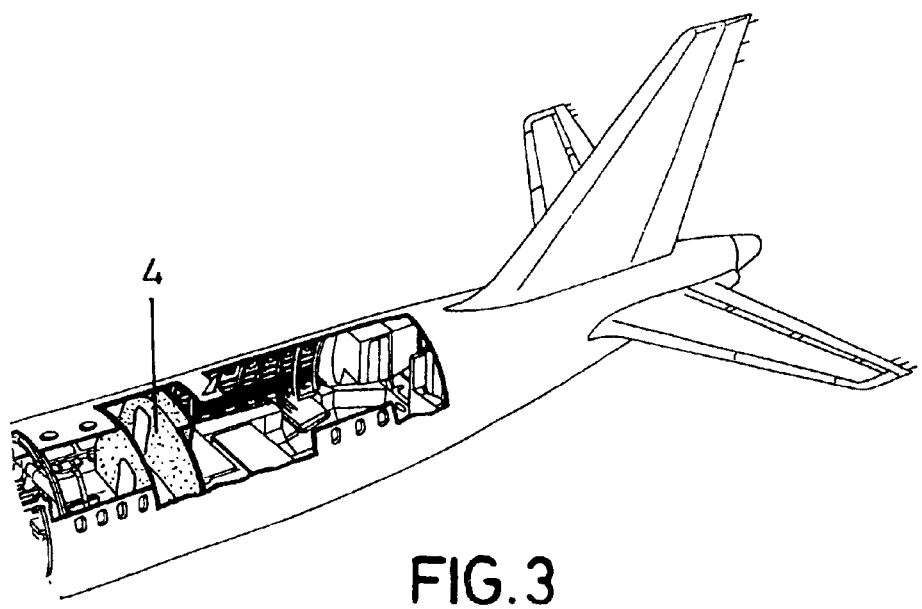
FIG. 3 is a partial view of an aircraft showing the rear central part thereof where, in this case, the security compartment is to be found, inaccessible to the passengers and crew.

With special reference to FIG. 3, the safety compartment (4) can be seen, comprising a separate and independent space with physiological services, without access to the cockpit and which defines an inaccessible space for the passengers and crew, provided with monitor for permanent viewing.

The components of this security team will be appointed and trained in accordance with government security regulations and in accordance with a set of defined rules of action.

The security cabin (4), as with the cockpit (2), will be provided with independent aeration and ventilation having devices for making contact with ground, as well as for switched triggering of the gas inundation system or emergency system.

Figure 4:
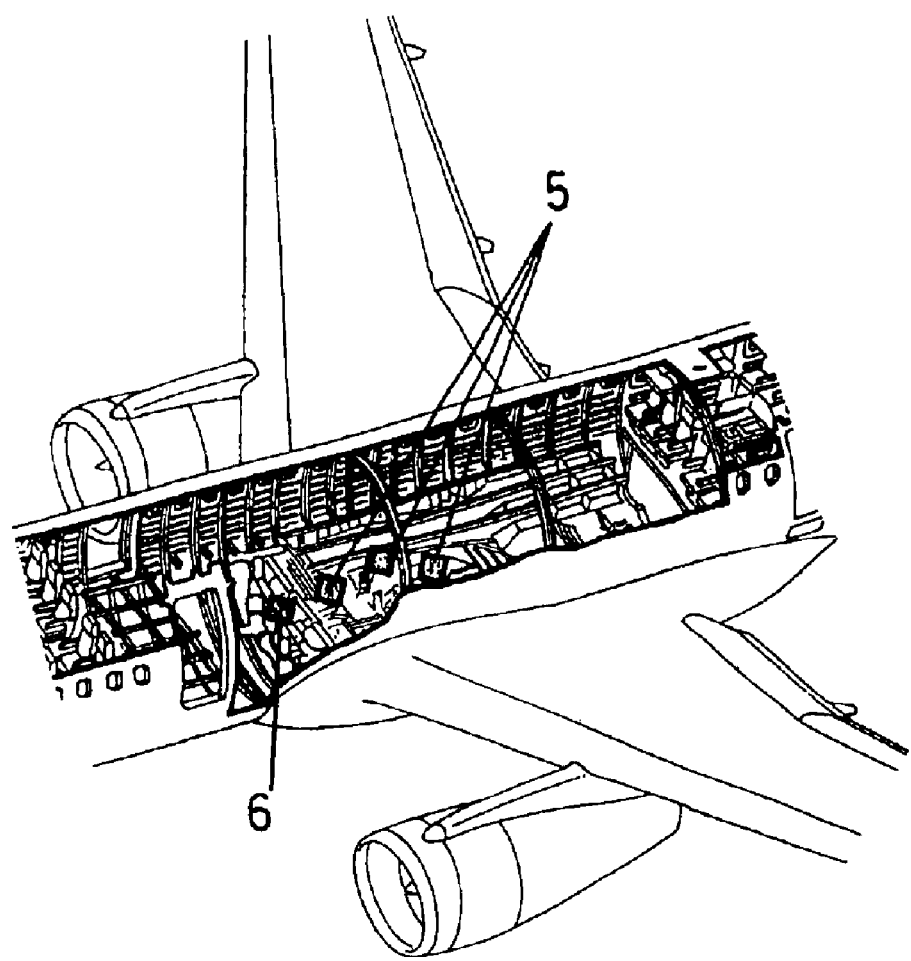
FIG. 4 is a partial view of an aircraft showing the central part thereof, where the ducts for some additional fuel tanks and other gas tanks are established in the event of emergency.

Finally, it can be seen in FIG. 4 that the zone of the diagram where the ducts for additional fuel tanks and conditioned air outlets (5) are established, and coinciding with the existing ducts (6), the necessary gas tanks are, depending on the model of aircraft, stored for the emergency situations that have been described, without having to make virtually any modification to the original conditions of the aircraft, combining the utilisation of the aeration and cooling of the aircraft itself.

However, the location of the paralysing gas tanks would not be anything other than a technical decision in terms of their distribution, and at no time would their distribution affect the efficiency with which the aircraft is protected.

The response time of the prototype gas is estimated at between four and ten seconds, according to the concentration used in its mixture with the air, which practically rules out the possibility of an air hijack.

A basic embodiment of the aircraft security system as described in the claims, which has the preventive means and response means in cases of emergency for guaranteeing immediate disablement of any violent action by means of bringing the perpetrators under control without any possibility of escape, attack or aggression, comprises:

a cockpit (2)
   with hermetic sealing in order to prevent penetration of gases,
   with security armour-plating for preventing physical penetration,
image capturing means (1, 3);
first transmitting means for transmitting the images obtained by the image capturing means (1, 3) to the cockpit (2);

first means of independent aeration and ventilation for the cockpit (2);

storing means for storing a paralysing gas;

expulsion means for expelling the paralysing gas;

a plurality of first switched triggers located in the cockpit (2), so that the stored paralysing gas can be expelled by the expulsion means and inundate the passenger cabin with complete paralysis of everyone in said cabin when the images obtained by the image capturing means (1, 3) show an emergency situation;

and the aircraft security system is characterized in that it comprises:

at least one security cabin (4)
    with hermetic sealing in order to prevent penetration of gases,
    with security armour-plating for preventing physical penetration,
independent communicating means between the at least one security cabin (4) and the cockpit (2);
second transmitting means for continuously transmitting the images obtained by the image capturing means (1, 3) to the at least one security cabin (4); second means of independent aeration and ventilation for the at least one security cabin (4);
a plurality of second switched triggers located in the security cabin (4), so that the stored paralysing gas can be expelled by the expulsion means and inundate the passenger cabin with complete paralysis of all people in said cabin when the images obtained by the image capturing means (1, 3) show an emergency situation.

The independent communicating means between the at least one security cabin (4) and the cockpit (2) can comprise at least one means selected from:

audio means, video means, and combinations thereof.

Optionally, the first means of aeration and ventilation and the second means of aeration and ventilation are shared by the cockpit (2) and by the at least one security cabin (4).

The aircraft security system can also comprise:

third transmitting means for transmitting the images obtained by the image capturing means (1, 3) to ground;

receiving means for receiving an order coming from ground so that the stored paralysing gas can be expelled by the expulsion means and inundate the passenger cabin with complete paralysis of all people in said cabin when the images obtained by the image capturing means (1, 3) show an emergency situation.

These third transmitting means can comprise mobile telephone means.

The image capturing means (1, 3) can comprise at least one means of vision selected from means of night-time vision, means of daytime vision, means of omnidirectional vision;

means of vision by wide angle;

means of vision provided with zoom;

and combinations thereof.

Said image capturing means (1, 3) permit a capture frequency of at least 14 images per second.

The aircraft security system can furthermore comprise recording means for recording the images obtained by the image capturing means (1, 3) on a data storage means.

As another additional characteristic, the first transmitting means, the second transmitting means, the third transmitting means, the recording means, can carry out their functions with the images obtained by the image capturing means (1, 3) done continuously.

The image capturing means and the recording means may use digital technology.

Optionally, the triggers for the paralysing gas can be provided with means for independent action on the part of at least one member of the flight crew.

The storing means for storing the paralysing gas and the expulsion means for expelling the paralysing gas can comply with the safety regulations for gaseous substances of certain physical and chemical characteristics. In particular, the storing means for storing the paralysing gas may comply with regulation RD 2216/1985.

The paralysing gas used in the aircraft security system can be selected from a gas and a mixture of gases.

Specifically, the paralysing gas can be nitrous oxide.

Additionally, the aircraft security system can comprise a supply of filtration masks for at least one member selected from security members, crew members and combinations thereof.

The paralysing gas used can comprise chemical components not filtered by conventional masks.

What is claimed is:

1. An aircraft security system, which has preventive means and response means in case of emergency for guaranteeing immediate disablement of any violent action by bringing perpetrators under control without any possibility of escape, attack or aggression, said security system comprising:

a cockpit (2)
    with hermetic sealing for preventing penetration of gases,
    with security armour-plating for preventing physical penetration,
image capturing means (1, 3);
first transmitting means for transmitting the images obtained by the image capturing means (1, 3) to the cockpit (2);
first means of independent aeration and ventilation for the cockpit (2);
storing means for storing a paralysing gas;
expulsion means for expelling the paralysing gas;
a plurality of first switched triggers located in the cockpit (2), so that a stored paralysing gas be expelled by the expulsion means and inundate the passenger cabin with complete paralysis of all people in said cabin when the images obtained by the image capturing means (1, 3) show an emergency situation;
characterized in that said security system comprises:
    at least one security cabin (4)
        with hermetic sealing for preventing penetration of gases,
        with security armour-plating for preventing physical penetration,
    independent communicating means between the at least one security cabin (4) and the cockpit (2);

second transmitting means for continuously transmitting the images obtained by the image capturing means (1, 3) to the at least one security cabin (4);

second means of independent aeration and ventilation for the at least one security cabin (4);

a plurality of second switched triggers located in the security cabin (4), so that the stored paralysing gas be expelled by the expulsion means and inundate the passenger cabin with complete paralysis of all people in said cabin when the images obtained by the image capturing means (1, 3) show an emergency situation.

2. An aircraft security system, according to claim 1, characterized in that it further comprises:

third transmitting means for transmitting the images obtained by the image capturing means (1, 3) to ground;

receiving means for receiving an order coming from ground so that the stored paralysing gas be expelled by the expulsion means and inundate the passenger cabin with complete paralysis of all people in said cabin when the images obtained by the image capturing means (1, 3) show an emergency situation.

3. An aircraft security system, according to claim 2, characterized in that the third transmitting means comprise mobile telephony means.

4. An aircraft security system, according to claim; 1, characterized in that it further comprises recording means for recording the images obtained by the image capturing means (1, 3) on a data storage means.

5. An aircraft security system, according to claim 1, characterized in that the independent communicating means between the at least one security cabin (4) and the cockpit (2) comprise at least one means selected from audio means,
video means,
and combinations thereof.

6. An aircraft security system, according to claim 1, characterized in that the first means of aeration and ventilation and the second means of aeration and ventilation are shared by the cockpit (2) and, by the; at least one security cabin (4).

7. An aircraft security system, according to claim 1, characterized in that the image capturing means (1, 3) comprise at least one means of vision selected from means of night-time vision;
means of daytime vision;
means of omnidirectional vision;
means of vision by wide angle;
means of vision provided with zoom;
and combinations thereof.

8. An aircraft security system, according to claim 1, characterized in that the image capturing means (1, 3) permit a capturing frequency of at least 14 images per second.

9. An aircraft security system, according to claim 1, characterized in that the first transmitting means,
the second transmitting means,
carry out their functions with the images obtained by the image capturing means (1, 3) in a continuous way.

10. An aircraft security system, according to claim 2, characterized in that the first transmitting means,
the second transmitting means,
the third transmitting means,
carry out their functions with the images obtained by the image capturing means (1, 3) in a continuous way.

11. An aircraft security system, according to claim 4, characterized in that the first transmitting means,
the second transmitting means,
the third transmitting means,
the recording means,
carry out their functions with the images obtained by the image capturing means (1, 3) in a continuous way.

12. An aircraft security system, according to claim 4, characterized in that the image capturing means and the recording means use digital technology.

13. An aircraft security system, according to claim 1, characterized in that the triggers for the paralysing gas are provided with means for independent action by at least one flight crew member.

14. An aircraft security system, according to claim 1, characterized in that the paralysing gas is selected from a gas and
a mixture of gases.

15. An aircraft security system, according to claim, 1, characterized in that the paralysing gas is nitrous oxide.

16. An aircraft security system, according to claim 1, characterized in that it further comprises a supply of filtration masks for at least one member selected from security members,
crew members
and combinations thereof.

17. An aircraft security system, according to claim 1, characterized in that the paralysing gas used comprises chemical components not filtered by conventional masks.

* * * * *